United States Patent [19]

Galbo

[11] Patent Number: 5,062,541
[45] Date of Patent: Nov. 5, 1991

[54] CLOSURE CAP

[75] Inventor: Vincent J. Galbo, Williamsville, N.Y.

[73] Assignee: U-Haul International, Inc., Phoenix, Ariz.

[21] Appl. No.: 497,268

[22] Filed: Mar. 22, 1990

[51] Int. Cl.⁵ .............................................. B15D 51/24
[52] U.S. Cl. ........................... 220/212; 220/DIG. 33; 220/293; 215/203; 215/230
[58] Field of Search ............... 220/212, 288, DIG. 33, 220/85 F, 86 R, DIG. 32, 293; 206/459; 116/284, DIG. 17; 40/492, 508, 331; 215/203, 230

[56] References Cited

U.S. PATENT DOCUMENTS

| | | | |
|---|---|---|---|
| 1,008,647 | 11/1911 | Kelso | 215/203 |
| 3,032,003 | 5/1962 | Lambert et al. | 215/230 X |
| 4,638,919 | 1/1987 | Feenick | 220/288 |
| 4,887,733 | 12/1989 | Harris | 220/DIG. 33 X |
| 4,921,120 | 5/1990 | Mizioch | 220/254 |

Primary Examiner—Stephen Marcus
Assistant Examiner—Paul Schwarz
Attorney, Agent, or Firm—Spensley Horn Jubas & Lubitz

[57] ABSTRACT

A closure cap for an automotive fuel tank displays informational indicia on one or more flags which are caused to project from the periphery of the cap when the cap is twisted for removal from the tank filler tube. The cap is constructed with two coaxially mounted plate members which are rotatably moveable relative each other by the act of twisting the cap off or on the filler cap. The relative movement of the two plates is utilized to propel the flags back and forth between one position in which the flags are disposed substantially entirely within the periphery of the cap and another position in which the flags extend substantially beyond the periphery of the cap.

7 Claims, 1 Drawing Sheet

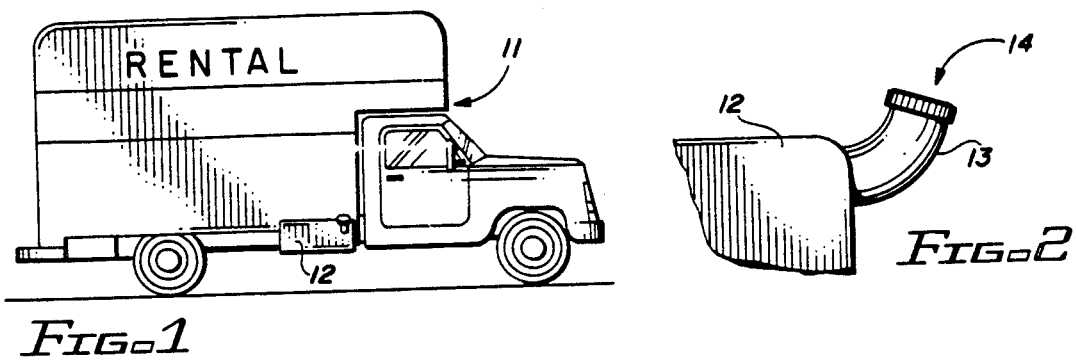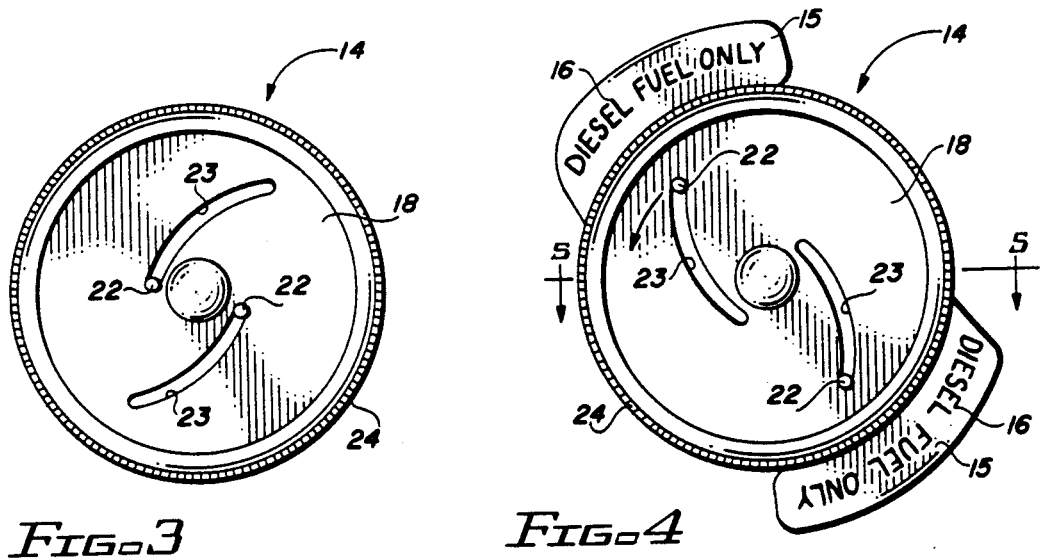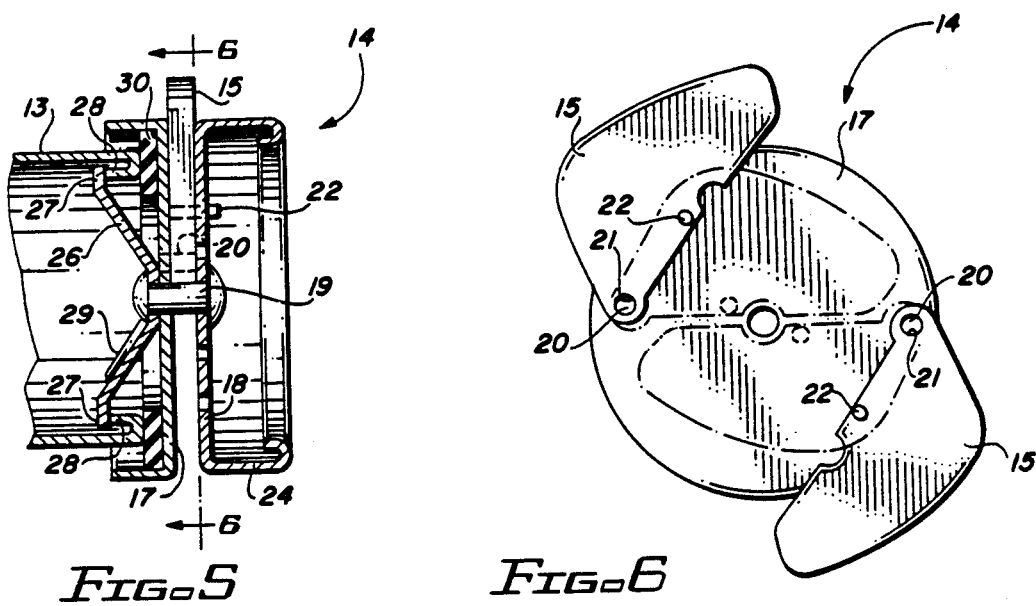

CLOSURE CAP

TECHNICAL FIELD

This invention is concerned with associating effective reminder messages with removal of the closure cap of a fuel tank.

BACKGROUND ART

Operators of fleets of rental moving vans powered by diesel engines have encountered problems with renters refilling fuel tanks with gasoline rather than diesel fuel. Most often the person who rents the vehicle is totally unfamiliar with the vehicle and its propulsion system. Force of habit formed through experience with his own personal passenger vehicle leads him to pump gasoline. And the distractions associated with the operation of a vehicle with which he is not familiar may cause him to fail to heed simple warning legends, such as "Diesel Fuel Only" on labels placed near the tank filler tube.

In the wholly unrelated field of containers for poisonous substances it has been proposed to associate signal flags with a bottle stopper to alert the user as to the nature of the contents when the stopper is removed. See U.S. Pat. No. 1,008,647 granted Nov. 14, 1911, to O. M. Kelso for "POISON BOTTLE". So far as is known no such alerting system has ever been adapted to vehicle fuel tank closure caps.

DISCLOSURE OF THE INVENTION

This invention contemplates the provision of at least one moveable signal flag between two coaxially positioned plate members in a closure cap. The arrangement is such that relative rotational movement between the two plate members occurs when one applies a turning force to the cap to remove it from the fuel tank inlet tube. This relative rotational movement of the two plates is utilized to cause the signal flag to move from a position in which it is substantially shielded from view within the cap to another position in which it extends substantially beyond the periphery of the cap to exhibit a message, such as, "Diesel Fuel Only".

BRIEF DESCRIPTION OF THE DRAWING

The invention is described in greater detail hereinafter by reference to the accompanying drawing wherein:

FIG. 1 is a side elevational view of a moving van type automotive vehicle to which the closure cap of this invention is advantageously applied;

FIG. 2 is an enlarged fragmentary view of the fuel tank and filler tube of the vehicle shown in FIG. 1;

FIG. 3 is an enlarged top view of the cover cap of this invention;

FIG. 4 is a view similar to FIG. 3 but showing the cap as it is being twisted off the tank filler tube;

FIG. 5 is a sectional view through the cap taken as indicated by line 5—5 in FIG. 4; and FIG. 6 is a sectional view through the cap taken as indicated by line 6—6 in FIG. 5 with flag components of the cap shown in dotted lines to illustrate alternative positions.

BEST MODE FOR CARRYING OUT THE INVENTION

In FIG. 1 the reference numeral 11 designates a rental moving van motor vehicle, one class of vehicle with which this invention is particularly useful. Vehicle 11 has a fuel tank 12 a fragment of which is shown in FIG. 2. Fuel is added to tank 12 through a filler tube 13, the inlet to which is closed by a closure cap 14. This invention is particularly concerned with the construction of cap 14. In particular, the invention is concerned with associating a mechanism with the cap to deliver a reminder message to a person removing the cap from the filler tube 13.

FIGS. 3 and 4 illustrate how the reminder message is presented. FIG. 3 shows cap 14 as it appears in a passive position to close and seal the entrance to filler tube 13. No message is displayed. FIG. 4 shows the cap as it is twisted in a counterclockwise direction to disconnect it and remove it from the filler tube 13. Note that two signal flags 15 have been caused to project outwardly substantially beyond the periphery of the cap 14 to display indicia 16 thereon depicting the desired message.

The content of the message provided by indicia 16 on flags 15 can vary depending upon the application. As mentioned previously, a "DIESEL FUEL ONLY" message is especially appropriate for rental moving vans operating on diesel fuel. A user of a gasoline powered vehicle might benefit from being admonished, for example, to "CHECK OIL", or "CHECK TIRES".

The protruding signal flags 15 for presenting message indicia 16 constitute a particularly effective mechanism for presenting reminder messages. This is so because the flags 15 present not only a visual message to the person removing the closure cap 14, but also present a tactile signal carrying an element of surprise. A person grasping cap 14 to twist and remove the cap from filler tube 13 likely will have one or more fingers in the path of movement of one or both of the flags 15. As the cap 14 is twisted, one or both flags 15 will come into contact with those fingers and require repositioning of the fingers before the cap can be twisted sufficiently to be dislodged from the filler tube. This surprise contact, wholly unexpected by one unfamiliar with the vehicle, can effectively call that person's attention to the cap and to the message indicia 16 on the flags 15. The message is thus much more effectively presented to that person than would be a message appearing on a label on or in the vicinity of the cap.

Although the signal flags 15 can be caused to move from their hidden positions of FIG. 3 to their message display positions of FIG. 4 by a variety of mechanisms, the preferred mode of accomplishing this is illustrated in FIGS. 5 and 6 in conjunction with FIGS. 3 and 4.

The basic construction of cover cap 14 comprises first and second relatively moveable plates, or plate members, designated 17 and 18 respectively. Plates 17 and 18 are preferably generally circular in configuration and are coaxially mounted for relative rotation of movement on a rivet-like pivot pin 19. Plates 17 and 18 are spaced apart a distance slightly larger than the thickness of signal flags 15 which are adapted to be positioned between the two plates.

Signal flags 15 are mounted on the first plate 17 for movement relative the plate from the FIG. 3 position in which they are disposed substantially entirely within the periphery of plates 17 and 18 to the FIG. 4 position in which they project substantially beyond the periphery of these plates. This mounting of the signal flags 15 preferably takes the form of pivot pins 20 mounted on the outer face of plate 17 and received in openings 21 in end regions of the flags 15.

The means for actuating the flags 15 in response to relative rotational movement of the plates 17 and 18 takes the form of a follower 22 attached to the inner edge of each flag 15 and projecting through a cam slot 23 in second plate 18. The configuration of cam slots 23 (shown in FIGS. 3 and 4) is such that rotation of the second plate 18 in a counterclockwise direction with respect to plate 17 (see arrow in FIG. 4) cams followers 22 outwardly causing the flags 15 to move from the dotted line positions depicted in FIG. 6 to their full line, or extended, positions shown in that figure.

Rotation of second plate 18 is facilitated by providing that plate with an upstanding grip rim 24 (see FIG. 5) the outer surface of which may be ribbed or knurled to improve one's grip on the cap 14.

Relative rotation of the two plates 17 and 18 as the cap 14 is twisted to remove it from the filler tube 13 is assured by providing resistance to the first plate 17 being rotated on filler tube 13. This resistance is provided by a more or less conventional coupling between the cap 14 and filler tube 13. This coupling comprises a spring-like finger member 26 attached to the inner face of plate 17 by pin 19. The ends 27 of finger member 26 are adapted to yieldingly engage spaced flanges 28 formed interiorly of the entrance to filler tube 13. Cam surfaces 29 (only one of which appears in FIG. 5) leading to each flange 28 flex the ends 27 of finger member 26 away from the surface of plate 17 drawing an annular gasket 30 into tight sealing engagement with the entry end of filler tube 13.

With cover cap 14 in sealing and closing engagement with filler tube 13 substantial resistance to turning of cap plate 17 is afforded by frictional engagement of the gasket 30 and finger member 26 with the end region of filler tube 13. Thus, when plate 18 is grasped by its grip rim 24 and twisted counterclockwise to remove cap 14, plate 17 carrying signal flags 15 remains stationary until cam slots 23 have cammed the followers 22 outwardly to present signal flags 15 and their message indicia 16. When followers 22 reach the ends of cam slots 23 the plates 17 and 18 become, in effect, locked together and further rotation of plate 18 results in equivalent rotation of plate 17 to free finger member 26 from filler tube flanges 28. The cap 14 may thereafter be removed from the filler tube 13, but only after signal flags have been projected outwardly to present the reminder message and give the user a surprise tactile signal.

It should be apparent, of course, that when the closure cap is returned to the filler tube and twisted thereon that relative movement between the plates 17 and 18 results in retraction of the signal flags 15.

From the foregoing it should be apparent that this invention provides improved means for associating reminder messages with removal of the closure cap of an automotive fuel tank. Changes and modifications within the scope of the appended claims will occur to those skilled in the art. For example, although the preferred mode of carrying out the invention utilizes a pair of signal flags 15, if desired, only one signal flag can be used.

What is claimed is:

1. A closure cap for a fuel tank, said cap comprising first and second coaxially-mounted plate members adapted for relative rotational movement about their common axes, a flag member mounted on one of said plate members for movement between one position in which the flag is disposed substantially entirely within the periphery of the cap and another position in which the flag extends substantially beyond the periphery of the cap, means for causing said flag to move from its said one position to its said other position in response to relative rotating movement of said plate members, and indicia on said flag which is covered when the flag is in its said one position and displayed when the flag is in its said other position.

2. A closure cap as set forth in claim 1 further characterized in that the cap is adapted to be twisted on and twisted off a tank filler tube, said first plate member having means thereon for frictionally engaging said filler tube whereby resistance to rotation of said first plate member is afforded when the cap is twisted on and twisted off the filler tube, said second plate member having grip means thereon adapted to be grasped by the person removing or replacing said cap, the arrangement being such that when said second plate member is rotated to twist the cap off the filler tube the relative rotational movement between the first and second plate members causes said flag to move from its said one position to its said other position to display said indicia.

3. A closure cap as set forth in claim 2 further characterized in that the means for causing said flag to move causes the flag to move from its said other position to its said one position when said second plate member is rotated to twist the cap onto the filler tube.

4. A closure cap as set forth in claim 1 further characterized in that the means for causing said flag to move causes the flag to move from its said other position to its said one position in response to opposite relative rotational movement of said plate members.

5. A closure cap as set forth in claim 1 further characterized in that said flag member is pivotally mounted on said one plate member.

6. A closure cap as set forth in claim 2 further characterized in that said flag member is pivotally mounted on said one plate member.

7. A closure cap as set forth in claim 3 further characterized in that said flag member is pivotally mounted on said one plate member.

* * * * *